US008944487B2

(12) United States Patent
Yuge

(10) Patent No.: US 8,944,487 B2
(45) Date of Patent: Feb. 3, 2015

(54) DOOR OPENING/CLOSING APPARATUS

(75) Inventor: Masaaki Yuge, Kanagawa (JP)

(73) Assignee: Mitsui Kinzoku Act Corporation, Yokohama-shi (JP)

( * ) Notice: Subject to any disclaimer, the term of this patent is extended or adjusted under 35 U.S.C. 154(b) by 0 days.

(21) Appl. No.: 13/182,968

(22) Filed: Jul. 14, 2011

(65) Prior Publication Data

US 2012/0042572 A1 Feb. 23, 2012

(30) Foreign Application Priority Data

Aug. 17, 2010 (JP) ................................ 2010-182452

(51) Int. Cl.
*B60J 5/10* (2006.01)
*E05F 15/12* (2006.01)
*B60P 1/26* (2006.01)

(52) U.S. Cl.
CPC ........... *E05F 15/127* (2013.01); *E05Y 2201/22* (2013.01); *E05Y 2201/422* (2013.01); *E05Y 2201/484* (2013.01); *E05Y 2201/72* (2013.01); *E05Y 2400/326* (2013.01); *E05Y 2800/11* (2013.01); *E05Y 2900/546* (2013.01)
USPC .................. 296/146.4; 16/79; 16/80; 49/340; 296/56

(58) Field of Classification Search
CPC .............. B60J 5/10; B60P 1/26; B62D 33/03; E05F 15/00; E05F 15/04; E05F 15/12; E05Y 2900/546
USPC ............. 16/50, 64, 76, 79, 80, 239, 240, 241, 16/242, 245, 246, 285, 286, 339, 340, 341, 16/342, 343, 345, 354, DIG. 7; 49/139, 49/324, 334, 339, 340, 341, 343, 345, 348, 49/349, 350, 358, 359; 296/50, 76, 106, 296/146.1, 146.4, 146.8, 56
See application file for complete search history.

(56) References Cited

U.S. PATENT DOCUMENTS

| | | | | |
|---|---|---|---|---|
| 1,249,110 | A * | 12/1917 | Kaiserman | 74/89.16 |
| 1,574,333 | A * | 2/1926 | Ackerman et al. | 49/350 |
| 4,045,914 | A * | 9/1977 | Catlett | 49/334 |
| 4,400,994 | A * | 8/1983 | Skjaeveland | 74/520 |
| 4,441,376 | A * | 4/1984 | Tobey | 74/89.32 |
| 4,912,806 | A * | 4/1990 | Orii et al. | 16/64 |
| 5,944,376 | A * | 8/1999 | Buchanan, Jr. | 296/146.4 |
| 6,007,133 | A * | 12/1999 | Heim et al. | 296/56 |
| 6,041,548 | A * | 3/2000 | Miller | 49/345 |
| 6,478,357 | B2 * | 11/2002 | Zhou | 296/56 |

(Continued)

FOREIGN PATENT DOCUMENTS

| | | | | |
|---|---|---|---|---|
| FR | 2569222 | A1 * | 2/1986 | E05F 15/12 |
| FR | 2690405 | A1 * | 10/1993 | B62D 25/10 |

(Continued)

*Primary Examiner* — Glenn Dayoan
*Assistant Examiner* — Paul Chenevert
(74) *Attorney, Agent, or Firm* — Foley & Lardner LLP

(57) ABSTRACT

A door opening/closing apparatus automatically opens and closes a door, and the door is supported by a vehicle body such that the door can open and close in a vertical direction. A plurality of link members connect the door and the vehicle body, and at least one of the link members is driven by the drive motor. A drive motor is provided integrally on or within at least one of the link members, and a connection shaft connects the link member having the drive motor and another link member that is adjacent to the former link member. The connection shaft is rotated by the drive motor.

1 Claim, 9 Drawing Sheets

(56) References Cited

U.S. PATENT DOCUMENTS

| | | | | |
|---|---|---|---|---|
| 6,520,557 | B2 * | 2/2003 | Benthaus et al. | 296/76 |
| 6,719,356 | B2 * | 4/2004 | Cleland et al. | 296/146.8 |
| 6,820,920 | B2 * | 11/2004 | Maeda | 296/146.8 |
| 7,293,819 | B2 * | 11/2007 | Duffy | 296/76 |
| 7,654,600 | B2 * | 2/2010 | Stratten | 296/50 |
| 7,695,043 | B2 * | 4/2010 | Zagoroff | 296/57.1 |
| 7,866,729 | B2 * | 1/2011 | Porat et al. | 296/146.4 |
| 7,938,473 | B2 * | 5/2011 | Paton et al. | 296/146.8 |
| 8,027,769 | B2 * | 9/2011 | Oualkadi et al. | 701/49 |
| 8,479,445 | B2 * | 7/2013 | Ichinose | 49/341 |
| 2005/0082870 | A1 * | 4/2005 | Chikata et al. | 296/146.2 |
| 2005/0144847 | A1 * | 7/2005 | Liles, Jr. | 49/334 |
| 2006/0244282 | A1 * | 11/2006 | Benoit et al. | 296/50 |
| 2013/0097931 | A1 * | 4/2013 | Keller et al. | 49/358 |

FOREIGN PATENT DOCUMENTS

| | | | | | |
|---|---|---|---|---|---|
| JP | 02164995 | A | * | 6/1990 | E05F 15/04 |
| JP | 4-157244 | A | | 5/1992 | |
| JP | 3795325 | B2 | | 4/2006 | |

* cited by examiner

DOOR OPENING/CLOSING APPARATUS

This application is based on Japanese patent application no. 2010-182452, filed Aug. 17, 2010, the entire contents of which is incorporated herein by reference.

BACKGROUND OF THE INVENTION

1. Field of the Invention

The present invention relates to a door opening/closing apparatus that automatically opens and closes a door of a vehicle by an electric actuator.

2. Description of the Related Art

As a door opening/closing apparatus for opening and closing a door that is supported by a vehicle body such that the door can open and close in a vertical direction, a door opening/closing apparatus that opens and closes a back door provided on a rear portion of the vehicle body by a drive mechanism is conventionally known (see, for example, Japanese Patent No. 3795325). According to the door opening/closing apparatus disclosed by Japanese Patent No. 3795325, a drive motor is provided in a rear portion of a vehicle body. As shown in FIG. 10, the door opening/closing apparatus includes a swing arm 62 whose one end is connected to a rotation shaft 61 of the drive motor, and a connection link 64 that connects the swing arm 62 and a hack door BD with each other. The door opening/closing apparatus drives the drive motor to rotate the swing arm 62 connected to the rotation shaft 61, thereby automatically opening and closing the back door BD through the connection link 64.

As shown in FIG. 10, in the door opening/closing apparatus of Japanese Patent No. 3795325, when the swing arm 62 starts rotating in a clockwise direction by a driving force of the drive motor, the driving force of the drive motor is transmitted from the swing arm 62 to the connection link 64. Therefore, the driving force of the drive motor is output as a force $F_0$ from the connection link 64 to the back door BD through a connection shaft 65. At this time, when the closed back door BD is driven to its opening direction, a torque ($=F_2 \times L_2$) obtained by multiplying a distance $L_2$ between the pivot shaft 67 and the connection shaft 65 by a component force $F_2$ of the force $F_0$ in a direction orthogonal to a line segment that connects the pivot shaft 67 and the connection shaft 65 with each other is applied to the pivot shaft 67 of the back door BD.

However, it is difficult to increase the component force $F_2$, the distance $L_2$ and the driving force of the drive motor due to the following reasons.

The component force $F_2$ is explained first. As shown in FIG. 10, when the swing arm 62 starts rotating in the clockwise direction by the driving force of the drive motor, a connection shaft 63 of the connection link 64 rotates in the clockwise direction around the rotation shaft 61. According to this configuration, the connection link 64 moves such that the connection shaft 63 approaches the pivot shaft 67 to operate the back door BD in its opening direction. Accordingly, the force $F_0$ output from the door opening/closing apparatus to the back door BD is applied in a direction toward the pivot shaft 67 in a state where a moving direction of the connection link 64 is different from a moving locus of the connection shaft 65 centered on the pivot shaft 67. As a result, the component force $F_2$ that actually rotates the back door BD in its opening direction becomes smaller than the force $F_0$.

If a torque applied to the back door BD when the drive motor is driven to open the back door BD is constant, it is necessary to increase the distance $L_2$ when the component force $F_2$ is small. In this case, the distance $L_2$ can be increased by moving a position of the connection shaft 65 in a downward direction of the back door BD. If the position of the connection shaft 65 is moved in this manner; however, the door opening/closing apparatus is placed at a front portion of the vehicle and there is a possibility that a space in a vehicle interior is sacrificed. The movement of the connection link 64 can be applied as the force $F_0$ directly rotating the back door BD by bringing the moving direction of the connection link 64 close to the moving locus of the connection shaft 65 centered on the pivot shaft 67. However, because the moving direction of the connection link 64 is directed to a longitudinal direction of the vehicle, there is a possibility that the space in the vehicle interior is sacrificed.

Furthermore, when it is difficult to increase the component force $F_2$ and the distance $L_2$ due to a layout of the vehicle, it is also possible to increase the component force $F_2$ by increasing the driving force of the drive motor. However, because there is a general trend that the size of the drive motor is increased, there is a possibility that the space in the vehicle interior is sacrificed.

As described above, because the driving force of the drive motor is transmitted from the swing arm 62 to the back door BD through the connection link 64, the door opening/closing apparatus disclosed in Japanese Patent No. 3795325 has a problem that there is a possibility that the space in the vehicle interior is sacrificed, and the transmission efficiency of the driving force generated by the drive motor is poor.

SUMMARY OF THE INVENTION

According to an aspect of the present invention, in a door opening/closing apparatus in which at least one of a plurality of link members that connect a vehicle body and a door supported by the vehicle body such that the door can open and close in a vertical direction is driven by an electric actuator, and the door automatically opens and closes, the electric actuator is provided on at least one of the link members, and the electric actuator rotates a connection shaft that connects a link member having the electric actuator and another link member that is adjacent to the link member having the electric actuator.

Advantageously, the door opening/closing apparatus further includes: a speed reducing mechanism that is provided on the link member having the electric actuator and that reduces a rotation speed of the electric actuator to transmit a driving force to a connection shaft of the link member; and a clutch mechanism that switches between transmission and non-transmission of a driving force of the electric actuator to the speed reducing mechanism.

Advantageously, in the door opening/closing apparatus, the speed reducing mechanism includes a spring, and when a driving force of the electric actuator is not transmitted, the spring applies a biasing force that biases the door in an opening direction to the speed reducing mechanism, and the spring holds the door at a stop position.

Advantageously, in the door opening/closing apparatus, a length of a link member that is placed on a side of the vehicle body is longer than that of other link members.

DETAILED DESCRIPTION OF THE PREFERRED EMBODIMENTS

Exemplary embodiments of a door opening/closing apparatus according to the present invention will be explained below in detail with reference to the accompanying drawings. The present invention is not limited to the embodiments.

Figure 1:
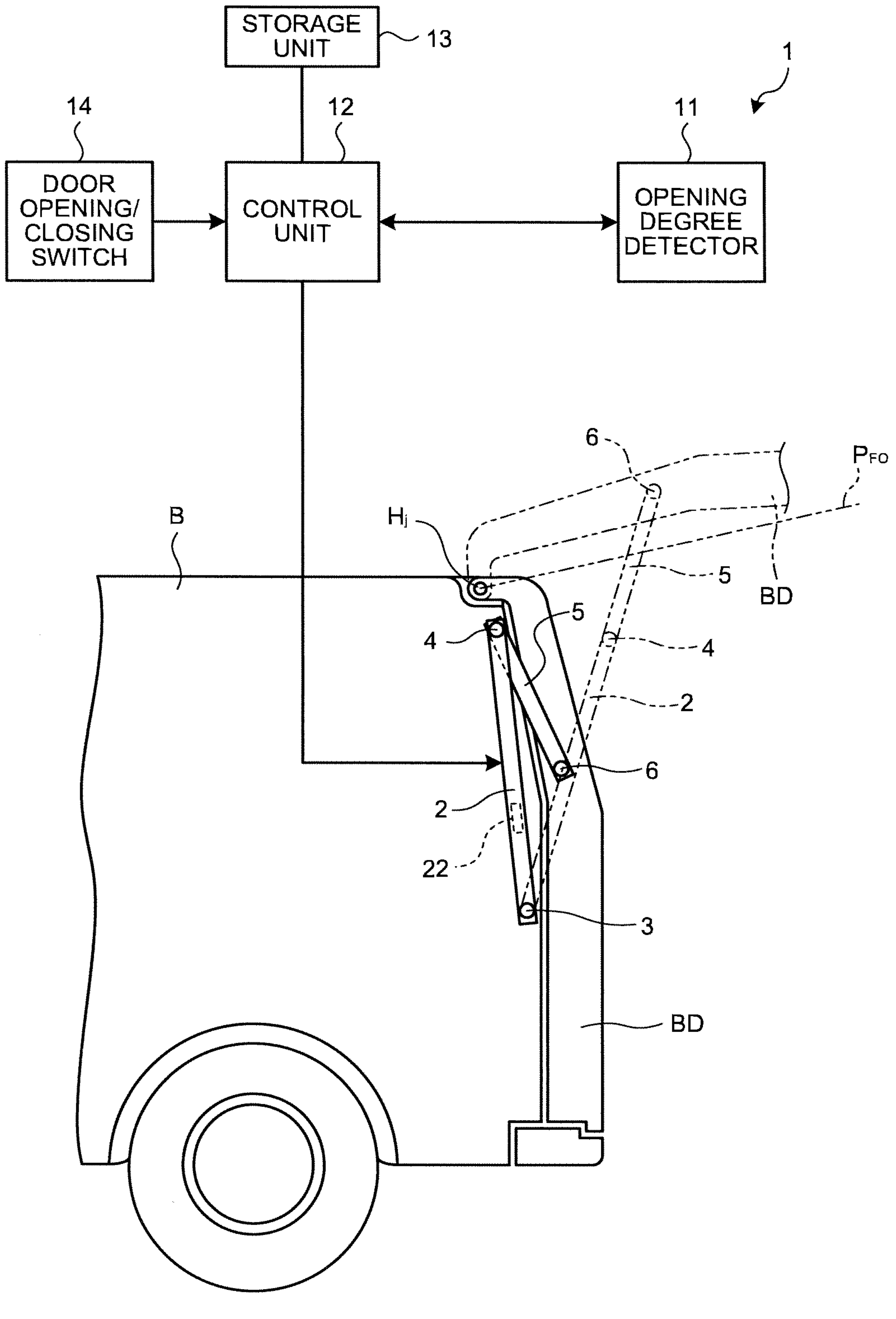
FIG. 1 is a conceptual side view of a rear portion of a vehicle including a door opening/closing apparatus that opens and closes a back door as a door opening/closing apparatus according to a first embodiment of the present invention.
Figure 2:
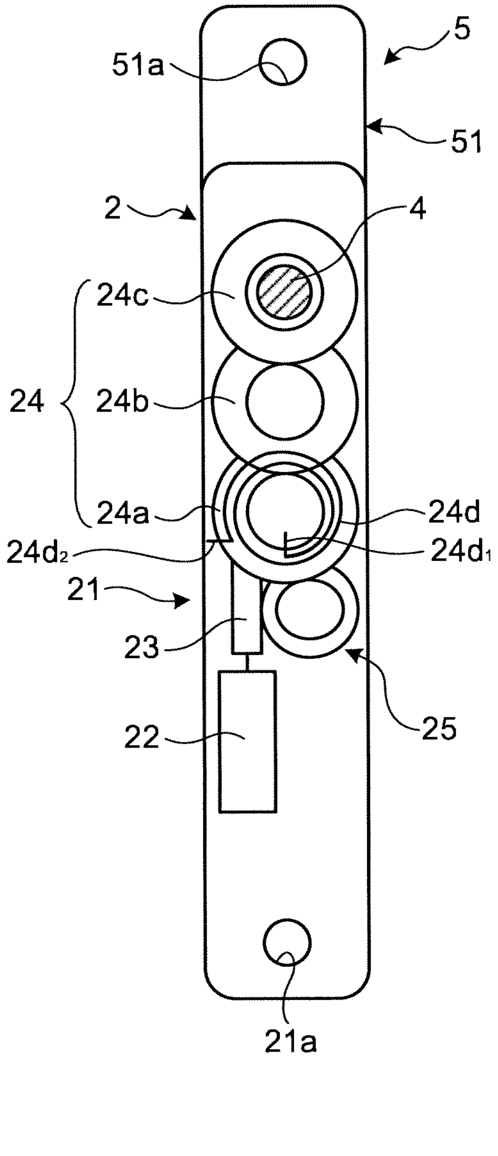
FIG. 2 is a schematic configuration diagram of a link member provided with an electric actuator of the door opening/closing apparatus shown in FIG. 1.
Figure 3:
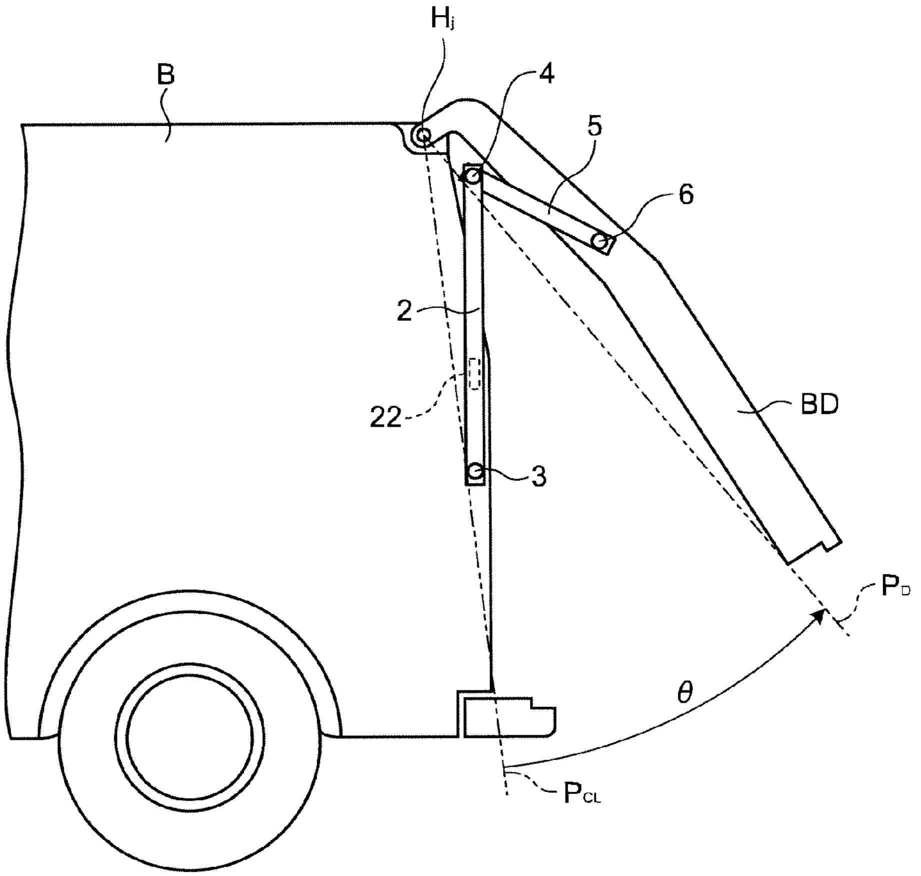
FIG. 3 is a schematic diagram for explaining an opening degree of the back door in a state where the back door shown in FIG. 1 is partially opened between its fully opened state and its fully closed state.

FIG. 1 is a conceptual side view of a rear portion of a vehicle including a door opening/closing apparatus that opens and closes a back door as a door opening/closing apparatus according to a first embodiment of the present invention. FIG. 2 is a schematic configuration diagram of a link member provided with an electric actuator of the door opening/closing apparatus shown in FIG. 1. FIG. 3 is a schematic diagram for explaining an opening degree of the back door in a state where the back door shown in FIG. 1 is partially opened between its fully opened state and its fully closed state.

As shown in FIG. 1, the door opening/closing apparatus 1 is provided on one side of a vehicle body (a frame) B of the vehicle between the vehicle body B and a lift-gate type back door BD. The back door BD is supported on a rear portion of the vehicle body B such that the back door BD can open and close in a vertical direction with respect to the vehicle body B. The door opening/closing apparatus 1 automatically opens and closes the back door BD. As shown in FIGS. 1 and 2, the door opening/closing apparatus 1 includes link members 2 and 5 that are connected with each other through connection shaft 4, an opening degree detector 11, a control unit 12, a storage unit 13, and a door opening/closing switch 14. The door opening/closing switch 14 is provided on an instrument panel of the vehicle body B or on a remote control key or the like, and a signal for instructing opening and closing operations of the back door BD is input through the door opening/closing switch 14. Both sides of the back door BD are supported by the vehicle body B through hinges $H_j$, and the back door BD is held in its closed state by a latch mechanism.

As shown in FIG. 1, one end of each of the link members 2 is connected to the vehicle body B through a connection shaft 3, and the other end of the link member 2 is connected to one end of the link member 5 through the connection shaft 4. As shown in FIG. 2, the link member 2 has a long casing 21. A drive motor 22, a worm 23, a speed reducing mechanism 24, and a clutch mechanism 25 are accommodated in the casing 21. An insertion hole **21*a* into which the connection shaft 3 is inserted is formed in the casing 21**.

As shown in FIG. 2, the worm 23 is mounted on a rotation shaft of the drive motor 22 as an electric actuator, and the drive motor 22 transmits output to the connection shaft 4 through the worm 23 and the speed reducing mechanism 24. The speed reducing mechanism 24 includes speed reducing gears **24*a* to 24*c* placed in this order from a side of the worm 23. A spring 24*d* is provided between the speed reducing gear 24*a* and the casing 21. One end $\mathbf{24d_1}$ of the spring 24*d* is locked to the speed reducing gear 24*a*, and the other end $\mathbf{24d_2}$ is locked to the casing 21. A spiral spring is used as the spring 24*d*, for example. The speed reducing gear 24*c* is placed coaxially with the connection shaft 4, and outputs a driving force of the drive motor 22 that is transmitted through the worm 23 and the speed reducing gears 24*a* and 24*b* to the connection shaft 4. The clutch mechanism 25 switches between transmission and non-transmission of the driving force of the drive motor 22 to the speed reducing mechanism 24**.

According to this configuration, when the back door BD is operated in its closing direction by the driving force of the drive motor 22 or operated manually, the speed reducing gear **24*a* rotates in the clockwise direction in FIG. 2, the spring 24*d* is wound and fastened, and a biasing force is accumulated in the spring 24*d*. As a result, when the back door BD is operated from a fully close position in the opening direction by the driving force of the drive motor 22 or operated manually, a force required for opening the back door BD can be assisted by the biasing force of the spring 24*d*. Even when a driving force of the drive motor 22 to the speed reducing mechanism 24 is not transmitted, the spring 24*d* applies the biasing force in the opening direction to the speed reducing mechanism 24**, and the back door BD is held at a stop position.

As shown in FIG. 1, one end of the link member 5 is connected to the link member 2 through the connection shaft 4, and the other end of the link member 5 is connected the back door BD through a connection shaft 6. The link member 5 is rotated around the connection shaft 4 together with the connection shaft 4 by a driving force transmitted from the drive motor 22 to the connection shaft 4. The link member 5 in a closed state of the back door BD is placed such that its longitudinal direction is directed to the hinge $H_j$. An insertion hole **51*a* through which the connection shaft 6 is inserted into a casing 51 is formed in the link member 5**.

The opening degree detector 11 is provided on the connection shafts 3, 4, or 6, or the hinge $H_j$ of the back door BD. As shown in FIG. 3, the opening degree detector 11 is an angle sensor that detects an open position $P_D$ of the back door BD as an opening degree θ based on a fully close position $P_{CL}$.

The control unit 12 is realized by using a central processing unit (CPU), and controls opening and closing operations of the back door BD by controlling the rotation of the drive motor 22. That is, the control unit 12 controls the rotation of the connection shaft 4 that connects the adjacent link member 2 and link member 5 with each other, thereby rotating the link member 5 together with the connection shaft 4, and the control unit 12 controls the opening and closing operations of the back door BD.

The storage unit 13 stores therein the opening degree θ of the back door BD detected by the opening degree detector 11 as the back door BD opens or closes, and a driving-speed control pattern that specifies a preset driving speed of the back door BD, for example. The control unit 12 controls the driving speed of the back door BD when it opens or closes such that the operating degree θ of the back door BD matches the driving-speed control pattern.

When the back door BD is to be opened, a passenger pushes the door opening/closing switch 14, and an instruction signal for opening the back door BD is input to the door opening/closing apparatus 1. The control unit 12 then drives the link members 2 to open the back door BD from the fully close position $P_{CL}$, and the back door ED opens to a fully open position $P_{FO}$ (see FIG. 1). When a door open signal is output, the control unit 12 outputs a control signal to the latch mechanism to release the closed state and then the control unit 12 makes the door opening/closing apparatus 1 start the opening operation of the back door BD.

When the back door BD is to be closed, a passenger pushes the door opening/closing switch 14, thereby inputting an instruction signal for closing the back door BD. The control unit 12 then controls the rotation of the connection shaft 4 through the drive motor 22 in a reversed manner. According to this configuration, the back door BD closes downward, the back door BD is brought into the closed state by the latch mechanism and the back door BD closes as shown with solid lines in FIG. 1.

As described above, the door opening/closing apparatus 1 controls the drive motor 22 by the control unit 12, thereby controlling the rotation of the connection shaft 4 that connects the adjacent link member 2 and link member 5 with each other. Therefore, according to the door opening/closing apparatus 1, the output driving force is applied from the link member 5 directly to the back door BD without through other link members by the connection shaft 4 to which the driving force of the drive motor 22 is output.

Figure 4:
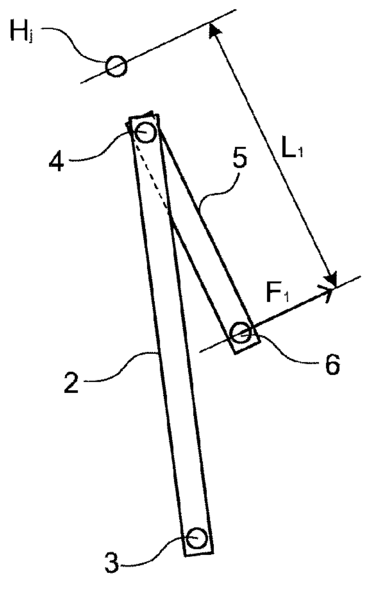
FIG. 4 is a schematic diagram for explaining a force that is output from a link member to the back door when the link member is rotated around a connection shaft.

FIG. 4 is a schematic diagram for explaining a force that is output from the link member 5 to the back door BD when the link member 5 is rotated around the connection shaft 4. As shown in FIG. 4, according to the door opening/closing apparatus 1, when the link member 5 is rotated around the connection shaft 4 by the driving force of the drive motor 22, a force $F_1$ output from the link member 5 to the back door 3D and a torque ($=F_1 \times L_1$) determined by a distance $L_1$ between the hinge $H_j$ and the connection shaft 6 make the back door BD operate in its opening direction. The door opening/closing apparatus 1 drives the connection shaft 4 that connects the adjacent link member 2 and link member 5, and a driving force is applied from the link member 5 directly to the back door BD without through other link members. Therefore, the transmission efficiency of a driving force generated by the drive motor 22 serving as the electric actuator is excellent.

Further, as shown in FIG. 4, the link member 5 in the closed state of the back door BD is placed such that its longitudinal direction is directed to the hinge $H_j$. Therefore, in a stationary state and in the closed state of the back door BD that requires a large force for operations in the opening direction, the force $F_1$ output from the link member 5 to the back door BD is applied into a tangent direction of an arc centered on the hinge $H_j$. As a result, even when the distance $L_1$ between the hinge $H_1$ and the connection shaft 6 and the force $F_1$ output to the back door BD have the same conditions as that of the door opening/closing apparatus of Japanese Patent No. 3795325, in the door opening/closing apparatus 1, the transmission efficiency of the driving force generated by the drive motor 22 is excellent.

Figure 5:
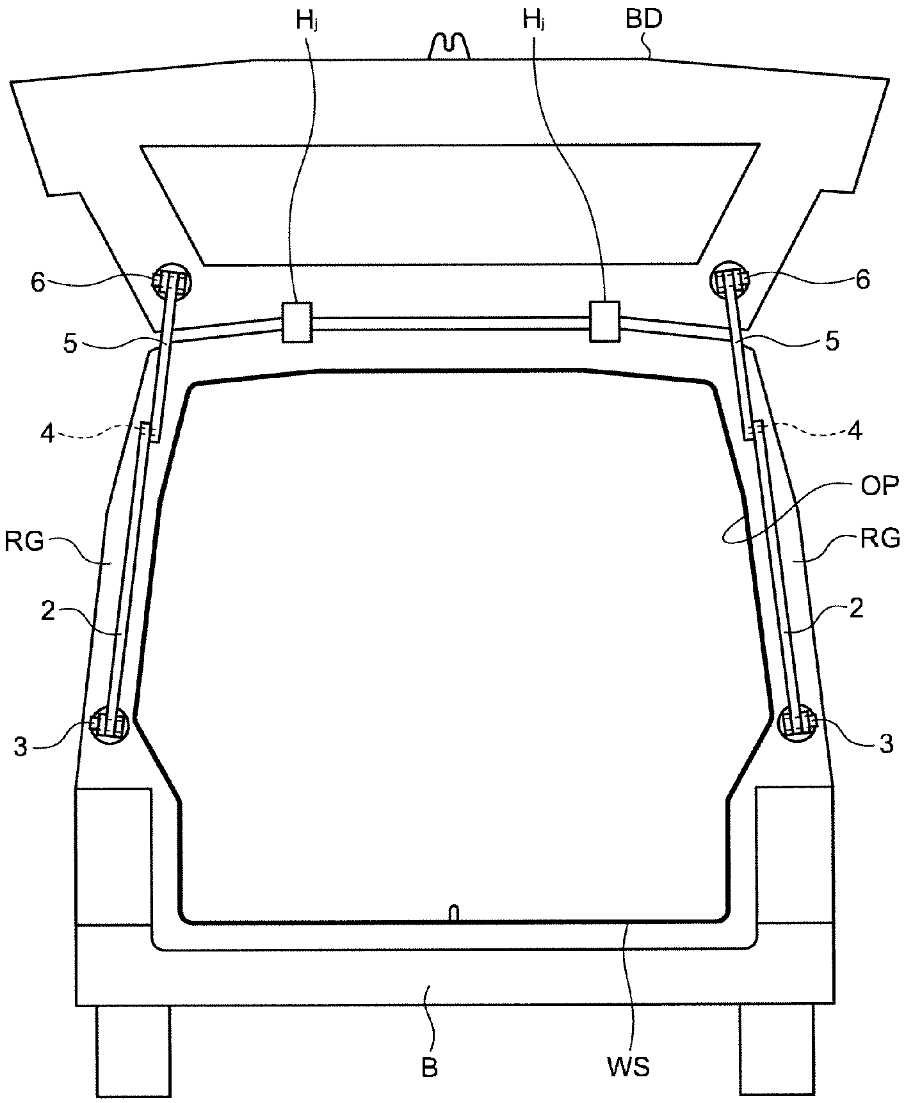
FIG. 5 is a conceptual view of the vehicle viewed from behind in an opened state of the back door.
Figure 6:
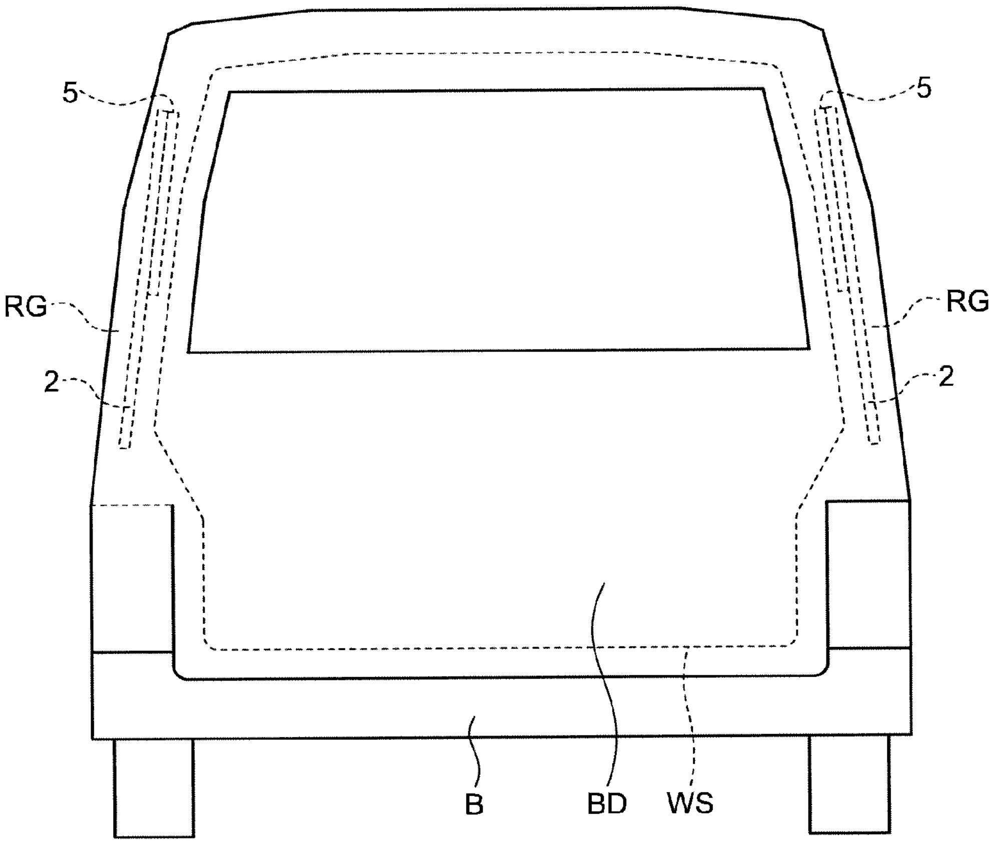
FIG. 6 is a conceptual view of the vehicle viewed from behind in a closed state of the back door.

FIG. 5 is a conceptual view of the vehicle viewed from behind in the opened state of the back door BD. FIG. 6 is a conceptual view of the vehicle viewed from behind in the closed state of the back door BD.

As shown in FIG. 5, a weather-strip WS is provided around an entire periphery of a rear opening OP of the vehicle body B. The weather-strip WS prevents rain drops from entering the vehicle interior. In the vehicle body B, rain gutters RG are provided in a vertical direction outside of the weather-strip WS on both sides of the vehicle and at locations that are covered and hidden with the back door BD when it closes. The rain gutters RG guide rain drops that enter from a gap between the vehicle body B and the back door BD to outside of the vehicle.

In the closed state of the back door BD, the door opening/closing apparatus 1 is accommodated in the rain gutters RG as shown in FIG. 6. According to this configuration, when the vehicle body B closes, because the door opening/closing apparatus 1 is not visible from the vehicle interior, the appearance around the back door BD is enhanced. Furthermore, because the door opening/closing apparatus 1 is not placed in the vehicle interior, the space in the vehicle interior is not sacrificed.

In the door opening/closing apparatus 1, because the link member 2 includes the spring **24*d* and the clutch mechanism 25, when the drive motor 22 is driven to open the back door BD, even when the driving force of the drive motor 22 is not transmitted by the clutch mechanism 25, the back door BD is held at the open position. Therefore, a vehicle that uses the door opening/closing apparatus 1 does not require any gas stays that hold the back door BD in its opened state. If the opened back door BD is pushed in its closing direction against the biasing force of the springs 24*d*, the back door BD can be manually closed without using the door opening/closing apparatus 1**.

As shown in FIG. 1, the length of the link member 2 placed on the side of the vehicle body B is set longer than the length of the other link member 5. According to this configuration, it is possible to reduce the distance between the hinge $H_j$ and the connection shaft 6. As a result, it is possible to suppress, to a small value, a biasing force of the spring **24*d* in the opening direction at a position immediately before the back door BD closes (a half latch position of a latch mechanism (not shown) provided in the back door BD), and it is possible to enhance the operability when the back door BD closes. Because the link members have different lengths as described above, operation characteristics of the door opening/closing apparatus 1** can be changed according to an intended purpose of a vehicle.

Although the link member 2 is provided with the drive motor 22 and the link member 5 is rotated by rotating the connection shaft 4 in the above explanations, the link member 5 can be provided with the drive motor 22 and the link member 2 can be rotated by rotating the connection shaft 4.

According to the door opening/closing apparatus 1 described above, the link member 2 is provided with the spring **24*d*, and when the driving force is not transmitted from the drive motor 22 to the speed reducing mechanism 24, the back door BD can be held at a stop position by the biasing force of the spring 24*d*. In addition, it is also possible to have a configuration that the clutch mechanism 25 is not provided in the door opening/closing apparatus 1, and the back door BD is held at a stop position by a resistance force of the drive motor 22 and by the biasing force of the spring 24*d***.

A door opening/closing apparatus according to a second embodiment of the present invention is explained next with reference to the drawings. In the first embodiment, the back door BD and the vehicle body B are connected with each other through the two link members 2 and 5. On the other hand, in the second embodiment, the back door BD and the vehicle body B are connected with each other through three link members. In the following explanations, constituent elements in the second embodiment that are identical to those of the door opening/closing apparatus 1 according to the first embodiment are denoted by like reference letters of numerals, and redundant explanations thereof will be omitted.

Figure 7:
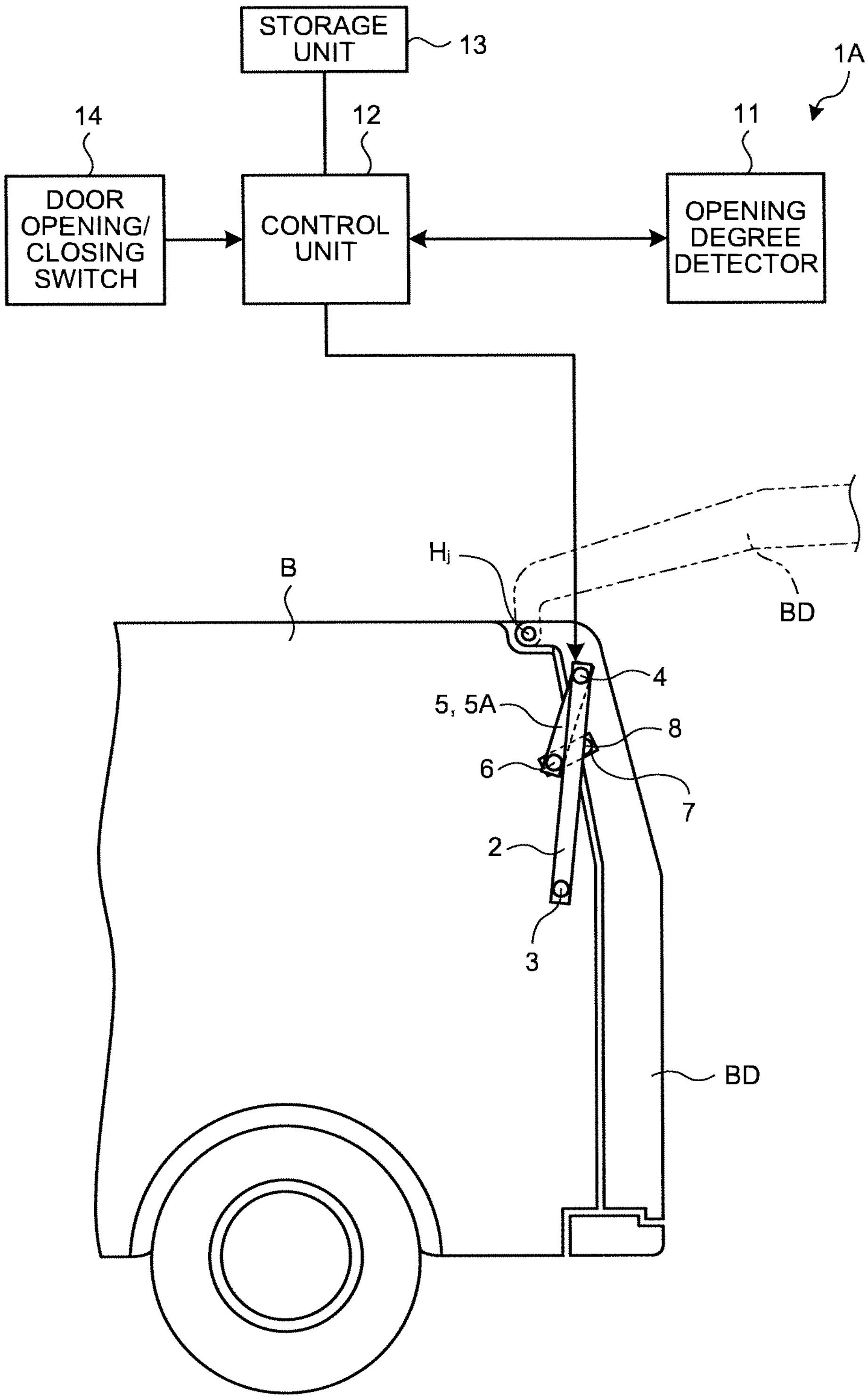
FIG. 7 is a conceptual side view of the rear portion of the vehicle having the door opening/closing apparatus that opens and closes the back door as the door opening/closing apparatus according to a second embodiment of the present invention.
Figure 8:
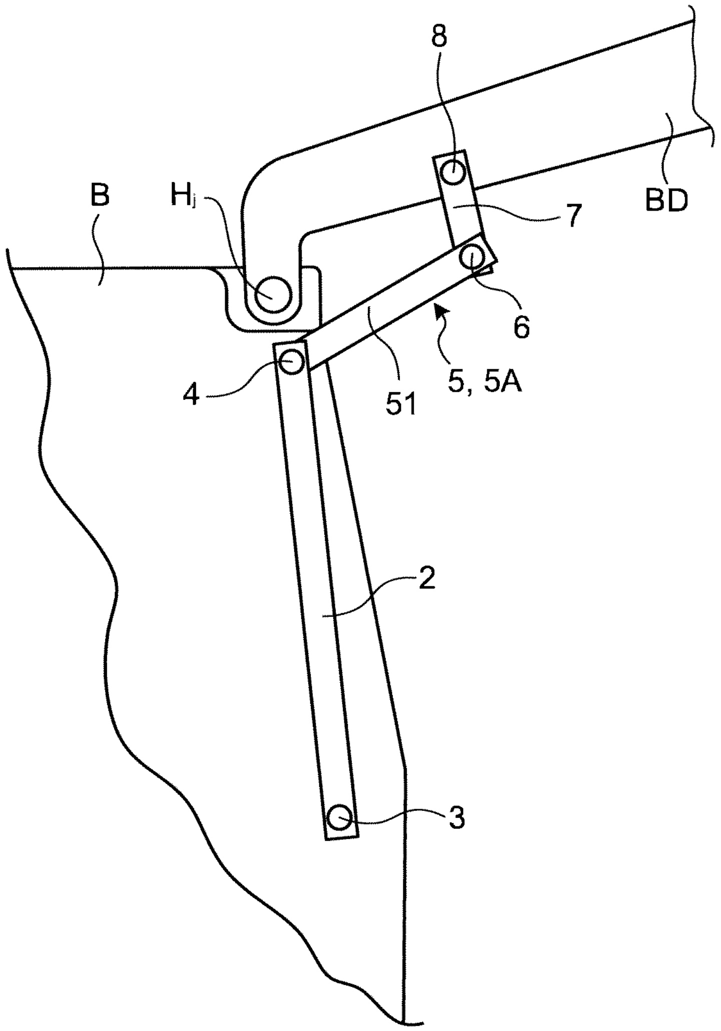
FIG. 8 is a schematic diagram for explaining connection of three link members in a state where the back door shown in FIG. 7 is partially opened between its fully closed state to its fully opened state.

FIG. 7 is a conceptual side view of the rear portion of the vehicle having the door opening/closing apparatus that opens and closes the back door as the door opening/closing apparatus according to the second embodiment. FIG. 8 is a schematic diagram for explaining connection of the three link members in a state where the back door shown in FIG. 7 is partially opened between its fully closed state to its fully opened state.

As shown in FIGS. 7 and 8, according to the door opening/closing apparatus 1A, the back door BD and the vehicle body B are connected with each other through the link members 2, 5, and 7. One end of the link member 5 is connected to the link member 2 through the connection shaft 4, and the other end of the link member 5 is connected to one end of the link member 7 through the connection shaft 6. The one end of the link member 7 is connected to the link member 5 through the connection shaft 6, and the other end of the link member 7 is connected to the back door BD through a connection shaft 8. The link member 5 has the same configuration as that of the link member 2. A drive mechanism, a worm, a speed reducing mechanism, and a clutch mechanism (all not shown) are accommodated in the casing 51, and a driving force of the drive motor is transmitted to the connection shaft 6. In FIGS. 7 and 8, the link members 2, 5, and 7 are superposed and placed in the number-increasing order from a side close to a left side surface of the vehicle body B, that is, from the near side (foreside) of the drawings of FIGS. 7 and 8.

According to the door opening/closing apparatus 1A having the configuration described above, when the door opening/closing switch 14 is pushed, a control signal is output from the control unit 12, the drive motor 22 of the link member 2 and the drive motor of the link member 5 are driven by this control signal, the link members 5 and 7 are rotated through the connection shafts 4 and 6, and the back door BD opens or closes. Therefore, according to the door opening/closing apparatus 1A, a driving force of the drive motor of the link member 5 is output to the connection shaft 6, and the output driving force is applied directly to the back door BD without through other link members.

According to the door opening/closing apparatus 1A, positions of the link members 2, 5, and 7 can be adjusted to those suitable for opening and closing the back door BD by rotating the link member 2 and the link member 5 by the connection shaft 4 of the link member 2 to which the driving force of the drive motor 22 is output, and by changing the positions of the link member 5 and the link member 7 with respect to the back door BD. Therefore, the door opening/closing apparatus 1A has better transmission efficiency of the driving force output from the drive motor of the link member 5 as compared with conventional apparatuses. At this time, opening angles of the adjacent link members 2, 5, and 7 are limited by the drive motor 22 and the drive motor of the link member 5. Therefore, the link members 2, 5, and 7 do not freely rotate around the connection shafts 4 and 6. As a result, as the link members 2, 5, and 7 are driven in the opening direction, they can rotate in a direction to which the back door RD is supposed to extend toward the opened state. Therefore, the transmission efficiency of the driving force is better than that of conventional apparatuses.

Because the door opening/closing apparatus 1A is not visible from the vehicle interior as the door opening/closing apparatus 1, the appearance around the back door BD is enhanced, and the space in the vehicle interior is not sacrificed. Furthermore, a vehicle that uses the door opening/closing apparatus 1A does not require any gas stays that hold the back door BD in its opened state.

According to the door opening/closing apparatus 1A, the link member 7 can be provided with a drive motor to rotate the connection shaft 6, and the link member 5 can be provided with a drive motor to rotate the connection shaft 4, thereby rotating the link members 2, 5, and 7.

Figure 9:
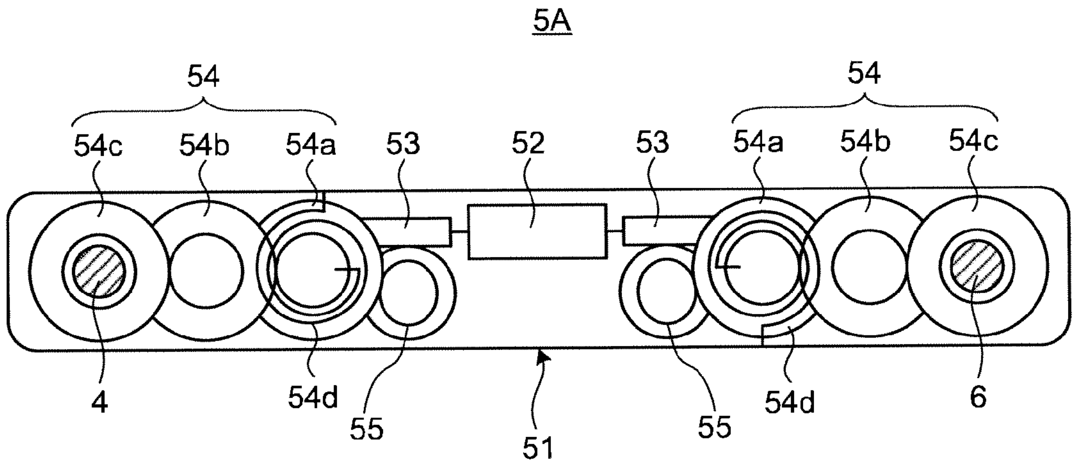
FIG. 9 is a schematic configuration diagram of a modification in which a link member is provided with the electric actuator.
Figure 10:
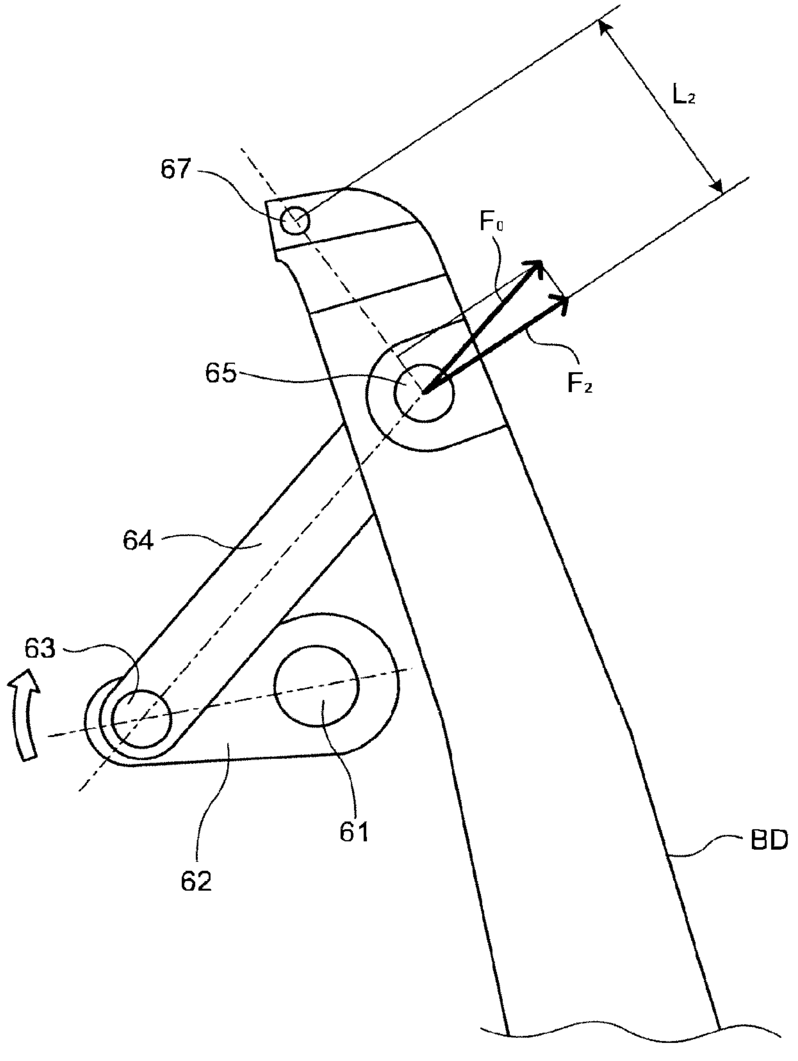
PRIOR ART FIG.10
FIG. 10 is a schematic diagram for explaining a force that is output from a link member to the back door when a swing arm is rotated around a rotation shaft, in the door opening/closing apparatus according to a conventional, prior art technique.

FIG. 9 is a schematic configuration diagram of a modification in which the link member 5A is provided with an electric actuator. As shown in FIG. 9, a link member 5A placed between the link members 2 and 7 has a drive motor 52 placed in the casing 51. Worms 53, speed reducing mechanisms 54, and clutch mechanisms 55 are axisymmetrically placed and accommodated on both sides of the drive motor 52. At this time, a speed reducing gear 54*c* of one of the speed reducing mechanisms 54 is placed coaxially with the connection shaft 4, and a driving force of the drive motor 52 transmitted through the worm 53 and speed reducing gears 54*a* and 54*b* is output to the connection shaft 4. Another speed reducing gear 54*c* of the other speed reducing mechanism 54 is placed coaxially with the connection shaft 6, and a driving force of the drive motor 52 transmitted through the worm 53 and the speed reducing gears 54*a* and 54*b* is output to the connection shaft 6. Each of speed reducing gears 54*a* has a spring 54*d* placed similarly to the spring 24*d* of the door opening/closing apparatus 1. When the driving force from the drive motor 52 to the speed reducing mechanism 54 is not transmitted, a biasing force in the opening direction of the back door BD is applied to the speed reducing mechanism 54, and the back door BD is held at a stop position. The clutch mechanism 55 switches between transmission and non-transmission of the driving force from the drive motor 52 to the speed reducing mechanism 54.

According to the link member 5A having the configuration described above, the connection shafts 4 and 6 are driven by the one drive motor 52 to rotate the link members 2 and 7. Therefore, the door opening/closing apparatus 1A can be downsized.

According to the door opening/closing apparatus 1A described above, the link members 2 and 5A are provided with the springs 24*d* and 54*d*, and when driving forces from the drive motors 22 and 52 are not transmitted to the speed reducing mechanisms 24 and 54, the back door BD can be held at a stop position by the biasing forces of the springs 24*d* and 54*d*. Alternatively, it is also possible to have a configuration that the clutch mechanisms 25 and 55 are not provided in the door opening/closing apparatus 1A, and the back door BD is held at a stop position by resistance forces of the drive motors 22 and 52 and by biasing forces of the springs 24*d* and 54*d*.

While the door opening/closing apparatus is applied to a back door of an automobile in the above embodiments, the door opening/closing apparatus according to the present invention can also be applied to a side door of a type that the door opening/closing apparatus opens and closes in a vertical direction with respect to the vehicle body B.

According to the present invention, an electric actuator is provided in one of adjacent link members of plurality of link members that connect a door and a vehicle body with each other, and a connection shaft that connects the adjacent link members with each other is rotated. Therefore, a driving force output by the connection shaft to which a driving force of the electric actuator is output is applied from the link member directly to the door without through other link members, and thus the transmission efficiency of the driving force generated by the electric actuator is excellent.

What is claimed is:

1. A door opening/closing apparatus comprising:

a plurality of link members configured to connect a vehicle body and a door supported by the vehicle body such that the door can open and close in a vertical direction; and an electric actuator configured to automatically open and close the door, wherein the plurality of link members include a first link member, a second link member, and a third link member, wherein a first end of the second link member is connected, through a first connection shaft, to a second end of the first link member, the first link member having a first end that is connected to the vehicle body, wherein a second end of the second link member is connected, through a second connection shaft, to a first end of the third link member, the third link member having a second end that is connected to the door, and wherein the electric actuator is provided on the second link member, and a driving force of the electric actuator is output to the first connection shaft so as to rotate the first link member and is output to the second connection shaft so as to rotate the third link member.

* * * * *